(12) United States Patent
Mehta et al.

(10) Patent No.: US 9,621,460 B2
(45) Date of Patent: Apr. 11, 2017

(54) CONNECTING MULTIPLE CUSTOMER SITES OVER A WIDE AREA NETWORK USING AN OVERLAY NETWORK

(71) Applicant: VERSA NETWORKS, INC., Santa Clara, CA (US)

(72) Inventors: Apurva Mehta, Cupertino, CA (US); Shivaprakash Shenoy, Los Altos, CA (US); Ramanarayanan Ramakrishnan, San Jose, CA (US); Krishna Sankaran, Milpitas, CA (US)

(73) Assignee: VERSA NETWORKS, INC., Santa Clara, CA (US)

( * ) Notice: Subject to any disclaimer, the term of this patent is extended or adjusted under 35 U.S.C. 154(b) by 38 days.

(21) Appl. No.: 14/150,640

(22) Filed: Jan. 8, 2014

(65) Prior Publication Data

US 2014/0198794 A1    Jul. 17, 2014

Related U.S. Application Data

(60) Provisional application No. 61/752,442, filed on Jan. 14, 2013.

(51) Int. Cl.
*H04L 12/50* (2006.01)
*H04L 12/741* (2013.01)
(Continued)

(52) U.S. Cl.
CPC ............ *H04L 45/74* (2013.01); *H04L 45/04* (2013.01); *H04L 45/28* (2013.01)

(58) Field of Classification Search
USPC .......................................... 370/392
See application file for complete search history.

(56) References Cited

U.S. PATENT DOCUMENTS

2012/0120957 A1\* 5/2012 Ould-Brahim ...... H04L 12/4641
370/392
2013/0201909 A1\* 8/2013 Bosch .................. H04W 40/36
370/328

(Continued)

OTHER PUBLICATIONS

VPNs Configuration Guide, Junos OS, Juniper Networks Inc., Release 12.1, Published Mar. 13, 2012, 836 pages.

(Continued)

*Primary Examiner* — Gregory Sefcheck
*Assistant Examiner* — Majid Esmaeilian
(74) *Attorney, Agent, or Firm* — Nicholson De Vos Webster & Elliott LLP

(57) ABSTRACT

A method and apparatus for connecting multiple customer sites over a wide area network (WAN) using an overlay network is described. In one embodiment of the invention, each one of multiple customer edge (CE) routers establishes a Border Gateway Protocol (BGP) session with one or more BGP route reflectors and announces their private IP network prefixes and one or more transport IP addresses to reach that CE router. The BGP route reflector(s) reflect those IP network prefixes and the one or more transport IP addresses to reach that specific CE router to the other CE routers. The CE routers receive those reflected IP network prefixes and the corresponding transport IP address(es) to reach that CE router in which those IP network prefixes belong and register them in their corresponding routing/forwarding data structures. In this way, the CE routers learn how to reach each other.

15 Claims, 9 Drawing Sheets

(51) Int. Cl.
    *H04L 12/715*    (2013.01)
    *H04L 12/703*    (2013.01)

(56) References Cited

U.S. PATENT DOCUMENTS

2015/0087371 A1* 3/2015 Hill .................... G07F 17/3293
                                                        463/11
2015/0264051 A1* 9/2015 Hoggan .............. H04L 63/0892
                                                        726/1

OTHER PUBLICATIONS

E. Rosen et al., BGP/MPLS IP Virtual Private Networks (VPNs), Network Working Group, Request for Comments: 4364, Feb. 2006, 48 pages.

* cited by examiner

CONNECTING MULTIPLE CUSTOMER SITES OVER A WIDE AREA NETWORK USING AN OVERLAY NETWORK

CROSS-REFERENCE TO RELATED APPLICATIONS

This application claims the benefit of U.S. Provisional Application No. 61/752,442, filed Jan. 14, 2013, which is hereby incorporated by reference.

FIELD

The present invention relates to the field of computer networking, and in particular to interconnecting multiple customer sites over a Wide Area Network (WAN) using an overlay network.

BACKGROUND

Internet Service providers (referred to as ISPs hereafter) currently provide Layer 3 Virtual Private Network (VPN) services to customers over the ISP's Multi-Protocol Label Switched (MPLS) networks. In such traditional inter-site VPN(s), the Customer Edge/Customer Premise Edge (CE/CPE) router peers with the ISP controlled Provider Edge/Provider (PE/P) routers in order to propagate enterprise subnets and/or aggregate routes into the operator WAN. The route propagation as well as traffic path management is driven by the operating ISP. ISPs are typically responsible for providing the quality of service (QoS) and guaranteed failover time for these services.

FIG. 1 illustrates one embodiment of the current network topology and method used to provide VPN services to customers over the ISP's MPLS networks. The CER 101, CER 102, CER 103 and CER 104 are customer edge (CE) routers and are part of the customer network. CER 101 is dual-homed with the provider edge (PE) routers PER 104 and PER 105, CER 102 is dual-homed with PER 106 and PER 107, CER 103 is dual-homed with PER 108 and PER 109. Although not illustrated, all of the PEs are connected to various routers in the ISP's core network 110. Various technologies like Multi-protocol label switching (MPLS) etc. may be used in the core network 110 which will help the providers achieve guaranteed QoS and failover time for their IP services. The core network 110 may include a number of provider (P) routers and route reflector(s) for the provider network. It is normally not required for the customer network to have a route reflector in its network for the VPN functionality. The network served by a CER are announced by the CER to its provider edge routers. These provider edge routers would propagate this information to other provider edge routers using MP-BGP. The data traffic originating in the customer network that is destined to remote site of the customer is encapsulated with a VRF label and sent to the remote PE. For example, when a station within site 144 residing in network NW 117 wants to communicate with another station residing in network NW 114 with site 143, the CE router 102 would forward the traffic to one of its PE router 107. The PE router 107 would then encapsulate this packet with a VRF label and a transport header. It would then send the traffic to the remote PE. In this example, it would arrive at PER 104. The PER 104 would then decapsulate the packet by removing any transport headers and the VRF label. It would then send the packet to the right CE router CER 101. The CER then would route this packet towards the destination network NW 114.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for connecting multiple customer sites over a wide area network (WAN) using an overlay network is described. In one embodiment of the invention, each one of multiple customer edge (CE) routers establishes a Border Gateway Protocol (BGP) session with one or more BGP route reflectors and announces their private IP network prefixes and one or more transport IP addresses to reach that CE router. The BGP route reflector(s) reflect those IP network prefixes and the one or more transport IP addresses to reach that specific CE router to the other CE routers. The CE routers receive those reflected IP network prefixes and the corresponding transport IP address(es) to reach that CE router in which those IP network prefixes belong and register them in their corresponding routing/forwarding data structures. In this way, the CE routers learn how to reach each other.

Figure 1:
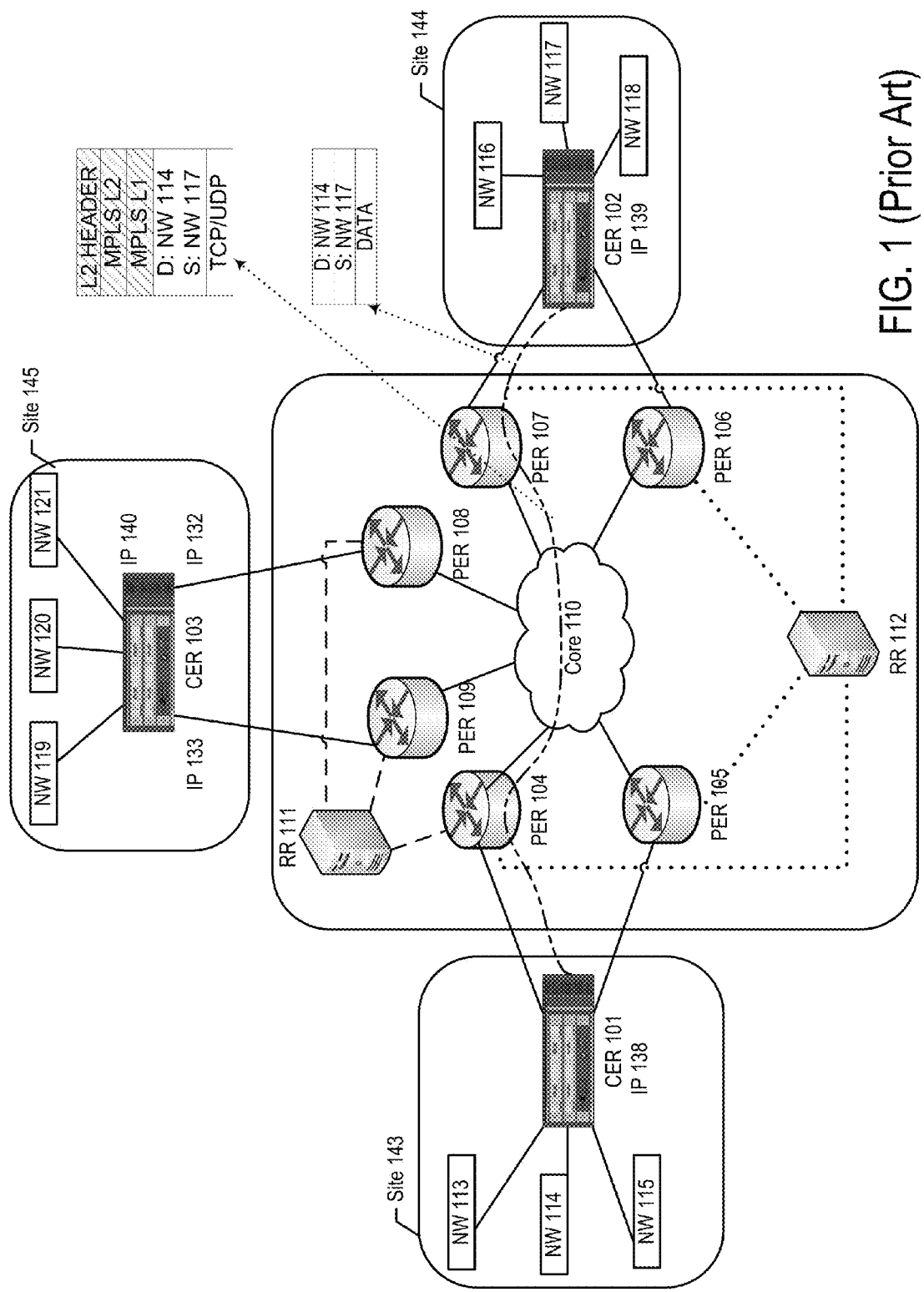
FIG. 1 illustrates one embodiment of the current network topology and method used to provide VPN services to customers over the ISP's MPLS networks.
Figure 2:
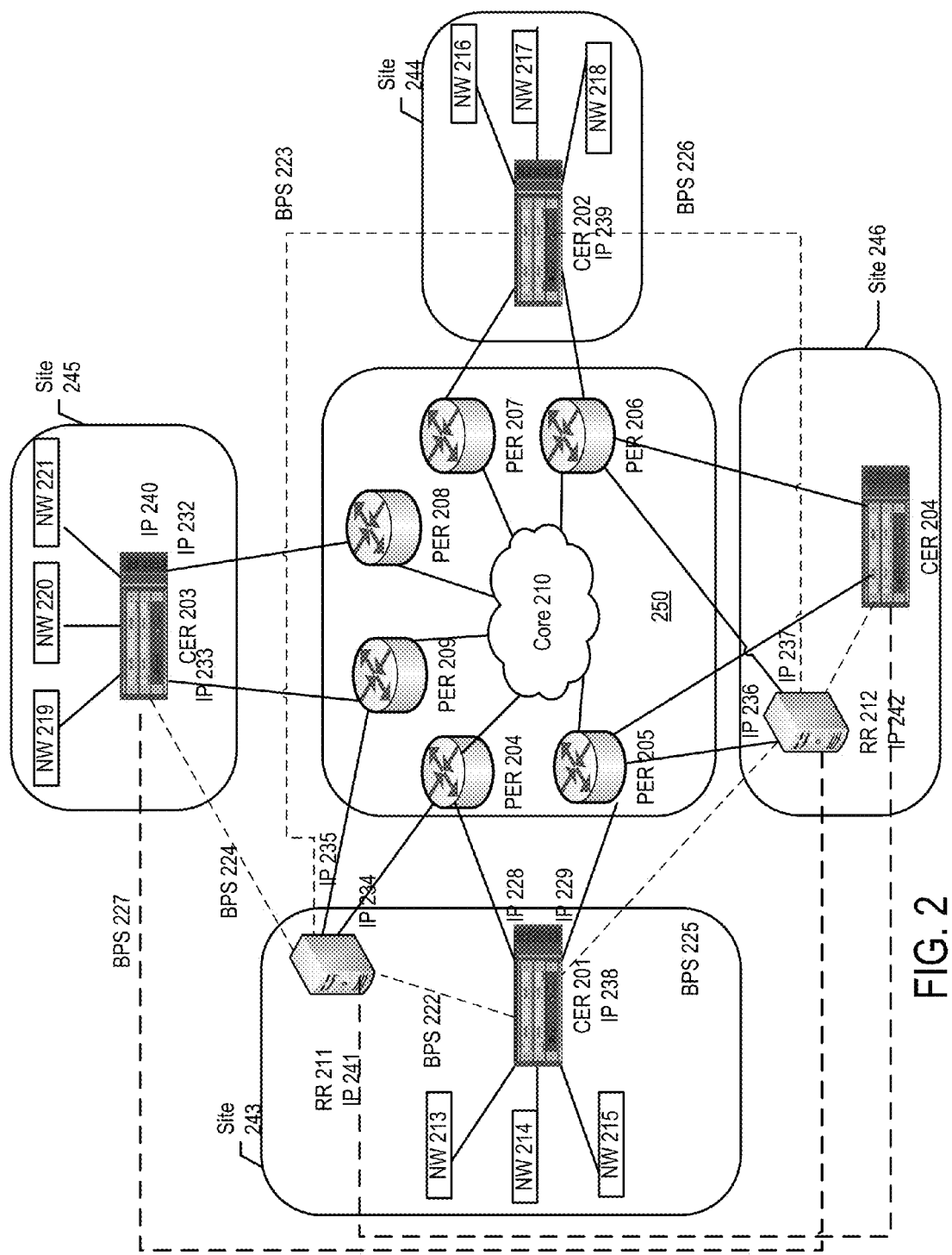
FIG. 2 illustrates an example network where multiple customer sites are connected over a WAN using an overlay network according to one embodiment.

FIG. 2 illustrates an example network where multiple customer sites are connected over a WAN using an overlay network according to one embodiment of the invention. The illustrated customer network includes four sites: sites 243, 244, 245, and 246 that are to be connected across a WAN. By way of example, these four sites may be different branch offices located in different cities of the same customer. While the example illustrated in FIG. 2 shows a relatively small number of sites, embodiments described herein are applicable to less number of sites or many more number of sites.

CER 201, CER 202, CER 203 and CER 204 are customer edge (CE) routers and are part of the customer network. CER 201 is dual-homed with the provider edge (PE) routers PER 204 and 205, CER 202 is dual-homed with PER 206 and 207, CER 203 is dual-homed with PER 208 and 209, and CER 204 is dual-homed with PER 205 and 206. The PE routers 204-208 are part of the service provider network 250. Although not illustrated, all of the PEs are connected to various routers in the ISP's core network 210. Various technologies like Multi-protocol label switching (MPLS) etc. may be used in the core network 210 which will help the providers achieve guaranteed QoS and failover time for their IP services. The core network 210 may include a number of provider (P) routers and route reflector(s) for the provider network.

Customer site 243 also includes the Border Gateway Protocol (BGP) route reflector (RR) 211. It is connected to provider edge routers PER 204 and PER 209. Customer site 246 includes the BGP route reflector 212. In the example of FIG. 2, RR 211 is the primary BGP route reflector in the customer network and RR 212 is the redundant BGP route reflector.

Each of the customer sites includes private IP sub-networks. These sub-networks may include multiple customer devices such as routers, desktops, laptops, printers, servers, hubs, or other Internet connected devices. NW 213, NW 214, and NW 215 are the private IP sub-networks at customer site 243 for which CER 201 is the Customer Edge Router. NW 216, NW 217 and NW 218 are the private IP sub-networks at customer site 244 for which CER 202 is the Customer Edge Router. Similarly, NW 219, NW 220, and NW 221 are the private customer IP network prefixes in the customer network behind CER 203. Although CER 204 is shown in the figure, we have not shown the sub-networks served by it.

IP address 228 and IP address 229 are the IP addresses of the CER interfaces connected to PER 204 and PER 205 respectively. Similarly, IP address 230 and IP address 231 are the IP addresses of the CE interfaces connected to PER 206 and PER 207 respectively. Similarly, IP address 232 and IP address 233 are the IP addresses of the CE interfaces connected to PER 208 and PER 209 respectively The IP addresses 228, 229, 230, 231, 232, 233 are static IP addresses assigned to the PE facing interface of the CEs. These are from the block of IP addresses which are assigned to the customer by the service provider. The static IP addresses 234, 235 are the IP addresses of RR 211's PE facing interfaces. Similarly IP addresses 236 and 237 are the IP addresses of RR 212's PE facing interfaces.

IP address 238 is the IP address assigned to a logical interface (called the loopback interface) of CER 201. Similarly IP address 239 is the IP address assigned to a loopback interface of CER 202. Similarly IP address 240 is the IP address assigned to a loopback interface of CER 203.

IP address 241 is the IP address assigned to a loopback interface address of RR 211. Similarly, IP address 242 is the IP address assigned to a loopback interface of RR 212.

The customer edge routers 201-204 may be configured using management techniques like command line interface/Element management system (EMS)/Simple Network Management Protocol (SNMP) etc. The CE routers 201-204 may be configured with default routes or there could be any routing protocol running between PEs and CEs. IP address 241 is the IP address assigned to a loopback interface address assigned to RR 211. Similarly, IP address 242 is the IP address assigned to a loopback interface of RR 212. IP address 241 and IP address 242 are selected from the private IP address space not assigned by the provider.

The CE routers 201-204 establish remote BGP peering sessions (BPS) denoted by BPS 222, BPS 223, BPS 224, BPS 225, BPS 226, BPS 227 to route reflectors RR 211 and RR 212. A route is configured on the CE routers 201-204 to enable them to reach the loopback addresses of the route reflectors 211-212. BGP control packets between the CE routers 201-204 and route reflectors 211-212 can be tunneled using one of the well-known tunneling mechanisms such as IP-in-IP, Generic Router Encapsulation (GRE), or Layer2 Tunneling Protocol (L2TPv3).

The following example describes the operations for the CER 201 establishing a BGP peering session with the route reflector 211. When CER 201 establishes a BGP peering session to the loopback address of RR 211, it forms an IP packet with a source IP address as IP address 238 and a destination IP address as IP address 241. It performs a route lookup in its internal routing tables. This first route lookup will return either IP address 234 or IP address 235 as the destination IP address. CER 201 will encapsulate the BGP packet within an outer IP packet (for IP-in-IP, GRE-in-IP, IPsec-in-IP). It will set the destination IP address of the outer IP packet from the result of the first route lookup. It will subsequently do another route lookup to reach the outer destination IP address which will return a next hop of one of the connected PEs (e.g., one of the PER 204 and 205). The IP address of the interface connected to this PE next hop would be populated as the source IP address of the outer IP packet. These packets are BGP control packets that have been tunneled through the IP network of the service provider. In some embodiments, there are optimizations in the software/hardware for recursive route lookup.

The route reflector 211 receives the BGP control packet from the CE router 201 and de-capsulates the outer packet. Based on information in both outer and inner IP packets, RR 211 will register in its internal data structures, the route to reach the loopback address of CER 201 (IP address 238) and the corresponding outer destination IP address which it should use to reach CER 201. Since this outer destination IP address is used to transport BGP packets to the BGP peer, it is henceforth referred to as a Transport IP Address.

After the BGP peering session 222 is established, the CER 201 announces the sub-networks NW 213, NW 214 and NW 215 to the RR 211. The CER 201 also announces one or more transport-addresses to reach itself. The CER 201 may announce the transport address(es) as a Network Layer Reachability Information (NLRI) utilizing a Sub Address Family Indicator (SAFI), as an Extended Community (an Extended Community is a BGP attribute that provides a mechanism for labeling information), or as some other new transitive BGP attribute. Multiple transport addresses may be announced from a particular CE router to act as a primary transport address and one or more secondary transport addresses. The CE routers may also indicate the priority of the transport addresses (e.g., which transport address is the primary transport address, etc.).

It should be noted that typically these transport-addresses would the same as the IP addresses of the access interfaces which are used to connect the CER or Router Reflector to the Provider Router. In our example, CER 201, would use one of the above mechanisms to announce IP address 228 and IP address 229 as the transport addresses to reach itself (IP 238). Similarly, CER 203 would use one of the above mechanisms to announce the transport IP addresses 233 and 232 to reach itself (IP 240). CER 202 and CER 204 would make similar announcements. CER 202, CER 203, and CER 204 would also establish BGP sessions to RR 211 using similar techniques.

RR 211 reflects the sub-networks to CER 202, CER 203 and CER 204. CER 202, CER 203 and CER 204 process the BGP packets and they register the routes NW 213, NW 214 and NW 215 and the corresponding destination loopback IP address to reach those networks in their software structures. CER 202, CER 203 and CER 204 would also register the Transport IP addresses to reach CER 201's loopback address IP address 238 based on the new BGP Route or new BGP attribute associated with the IP addresses of PE facing interfaces. Please note that the IP address of the PE facing interfaces is the same as the Transport Addresses which was mentioned previously. Similarly all CEs learn how to reach each other.

Figure 3:
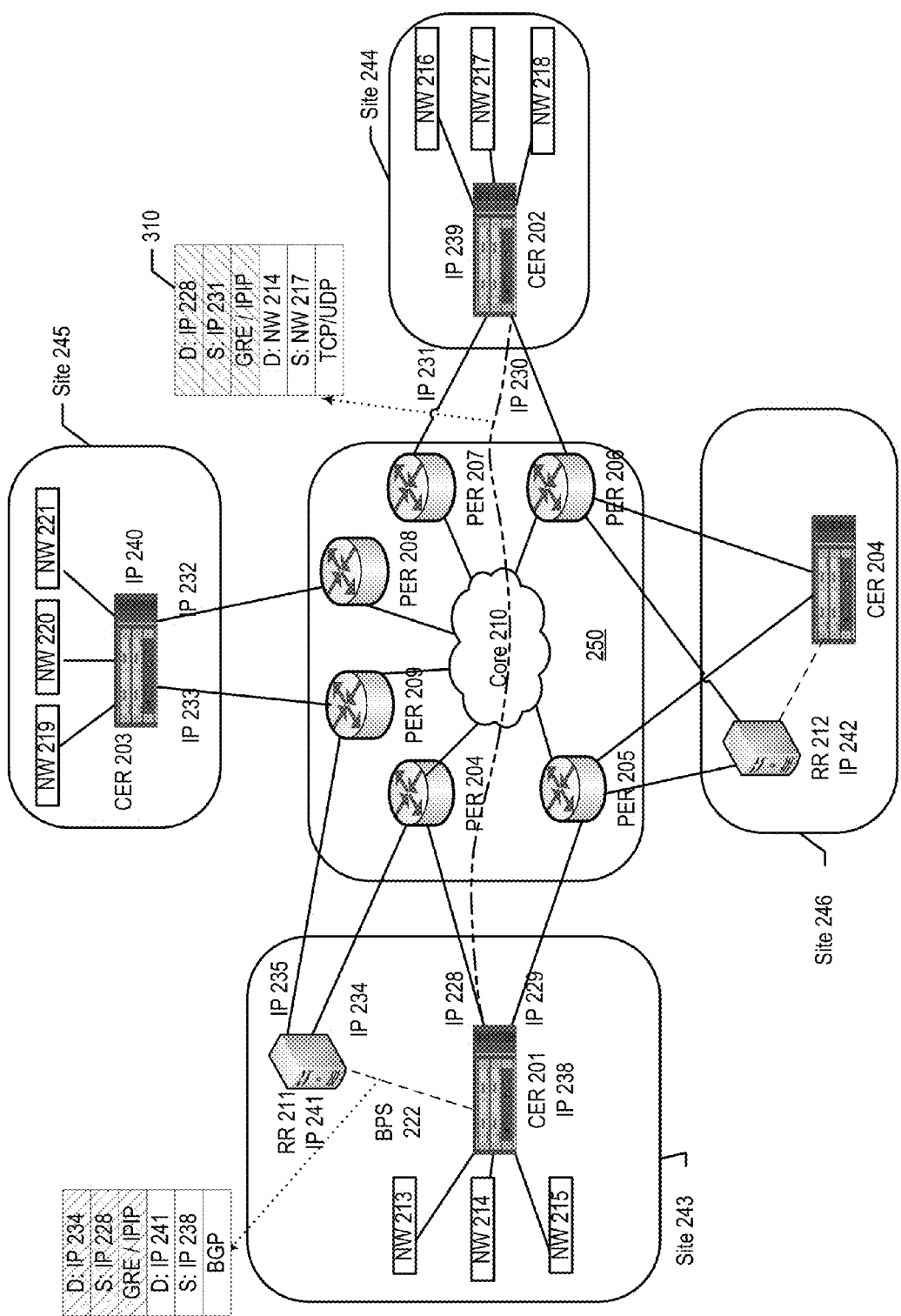
FIG. 3 illustrates the example network of FIG. 2 that shows data flow between different customer sites according to one embodiment.

The data path is now setup and ready to use. CEs can use tunneling mechanisms such as GRE, IP-In-IP or L2TPv3. For example, as illustrated in FIG. 3, when a device in subnet NW 217 would like to communicate with a device in NW 214, it forms an IP packet and forwards it to its default-router CER 202. After receiving this packet, CER 202 does a route-lookup for destination NW 214. CER 202 finds that network NW 214 is reachable behind CER 201. CER 202 encapsulates the packet it receives from device on NW 217 within a GRE or IP-In-IP packet and sends it to CER 201. This is illustrated as packet 310. On receiving this packet, CER 201 de-capsulates the packet forwards it towards network NW 214.

Figure 4:
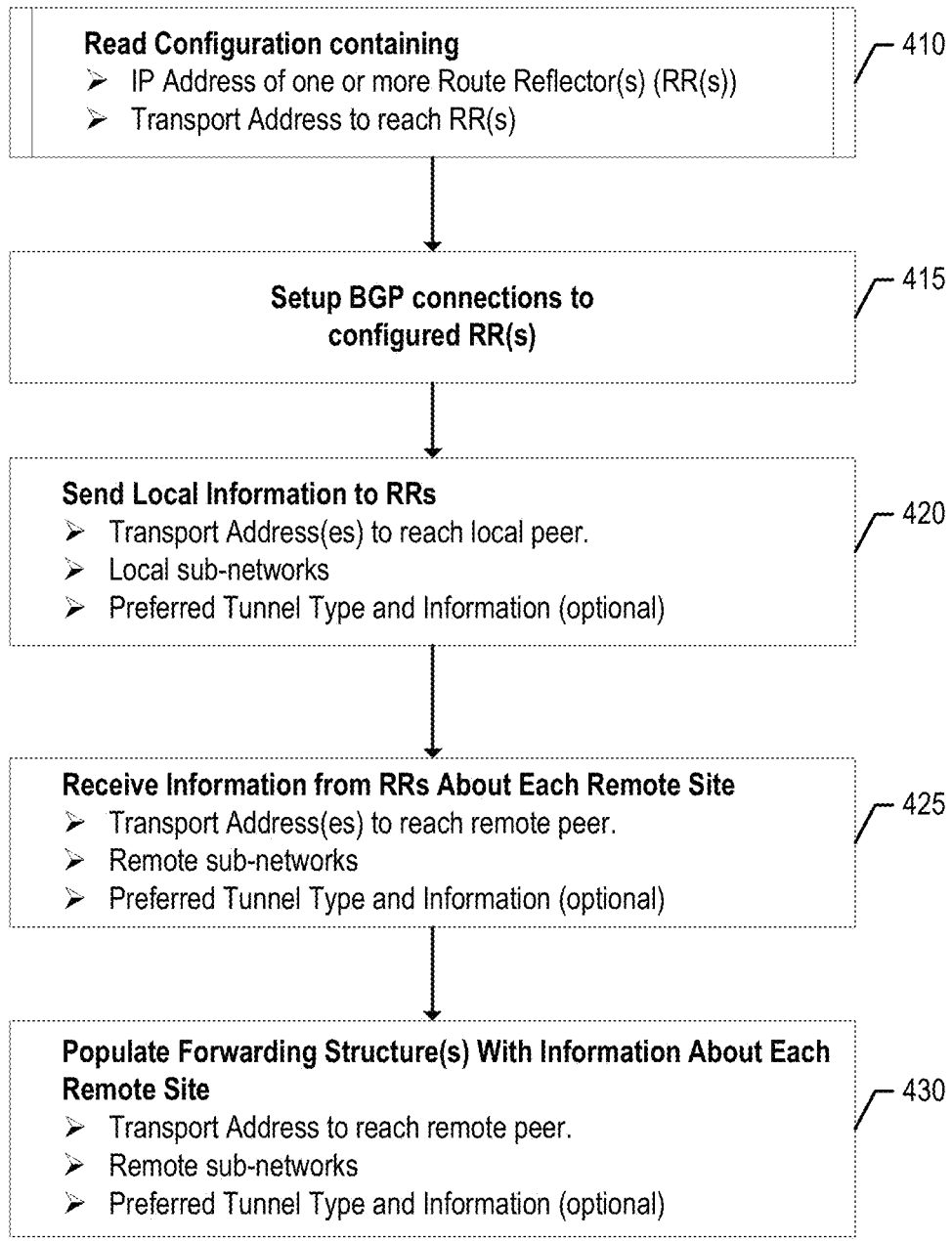
FIG. 4 is a flow diagram that illustrates exemplary operations for establishing a data path for connecting multiple customer sites over a WAN using an overlay network according to one embodiment.

FIG. 4 is a flow diagram that illustrates exemplary operations for establishing a data path for connecting multiple customer sites over a WAN using an overlay network according to one embodiment. The operations of this flow diagram and others in the description will be described with reference to the exemplary embodiment of FIG. 2. However, it should be understood that the operations of the flow diagrams can be performed by embodiments other than those discussed with reference to FIG. 2, and the embodiments discussed with reference to FIG. 2 can perform operations different than those discussed with reference to the flow diagrams. In one embodiment, each of the CE routers 201-204 perform the operations described in FIG. 4.

At operation 410, a CE router reads configuration information for establishing a data path for connecting multiple customer sites over a WAN using an overlay network. For example, the configuration information may include the IP address of one or more route reflectors, and one or more transport addresses for the CE to reach the route reflector(s). As previously described, there may be multiple route reflectors for redundancy purposes in some embodiments. By way of specific example, the CE router 201 reads the IP addresses 241 and 242 of the route reflectors 211 and 212 respectively and the transport addresses 234 and 235 for the route reflector 211 and transport addresses 236 and 237 for the route reflector 212. Flow moves from operation 410 to operation 415.

At operation 415, the CE router establishes a BGP peer session with the configured route reflector(s). By way of example, the CE router 201 establishes a BGP peer session with the route reflector 211 and the route reflector 212. The BGP peer sessions with the route reflectors 211 and 212 may be tunneled through the PE routers 204 and 205 respectively. Flow then moves to operation 420.

At operation 420, the CE router transmits local information to the route reflector(s) for reaching that CE router and reaching that CE router's underlying local sub-networks. For example, the local information may include the one or more transport addresses to reach the local peer, one or more local sub-networks (local to the site in which the CE router performing this operation is in), and optionally the preferred tunnel type and tunnel specific information (e.g., keys, password, and any other tunnel specific information). By way of example, the CE router 201 announces the IP addresses 228 and 229 to the route reflectors 211 and 212 and announces the networks 213-215. As described above, the CE router 201 may announce the transport IP addresses 228 and 229 as a NLRI utilizing a SAFI, or as an Extended Community, or as a transitive BGP attribute. As part of announcing the networks 213-215, the IP address prefixes of those networks are announced. Flow moves from operation 420 to operation 425.

As previously described, the route reflector(s) will reflect the transport address(es) to reach the local peer as well as the local sub-networks to the other CE routers of the customer's network (those that are registered and peered with the route reflector(s)). At operation 425, the CE router receives reachability information from the route reflector(s) about each remote site. This reachability information includes the transport address(es) to reach each remote peer (each remote CE router) as well as the sub-networks belonging to that remote peer, and may optionally include the preferred tunnel type and tunnel-specific information to reach that CE. By way of example, the CE router 201 may receive from the route reflector 211 (and possibly the route reflector 212) reachability information for each of the CE routers 202-204. By way of a specific example, the CE router 201 may receive from the route reflector 211 reachability information for the CE router 202 including the transport IP addresses 230 and 231 and the networks 216, 217, and 218. Flow then moves to operation 430.

At operation 430, the CE router populates one or more routing and/or forwarding structures (e.g., Routing Information Base (RIB), Forwarding Information Base (FIB), etc.) with the received reachability information about each remote site including the transport address(es) to reach each remote peer and their corresponding sub-networks, and the preferred tunnel type and information. The routing and/or forwarding structures are populated such that upon receipt of a packet destined for a device in another site of the customer, the CE router looks up the destination and determines that it is reachable behind another CE router in the network and encapsulates the packet it receives from the device within a GRE or IP-In-IP packet and transmits it towards the destination CE. The destination CE receives the packet, decapsulates the packet to determine the destination IP address, and forwards it to that network.

Figure 5:
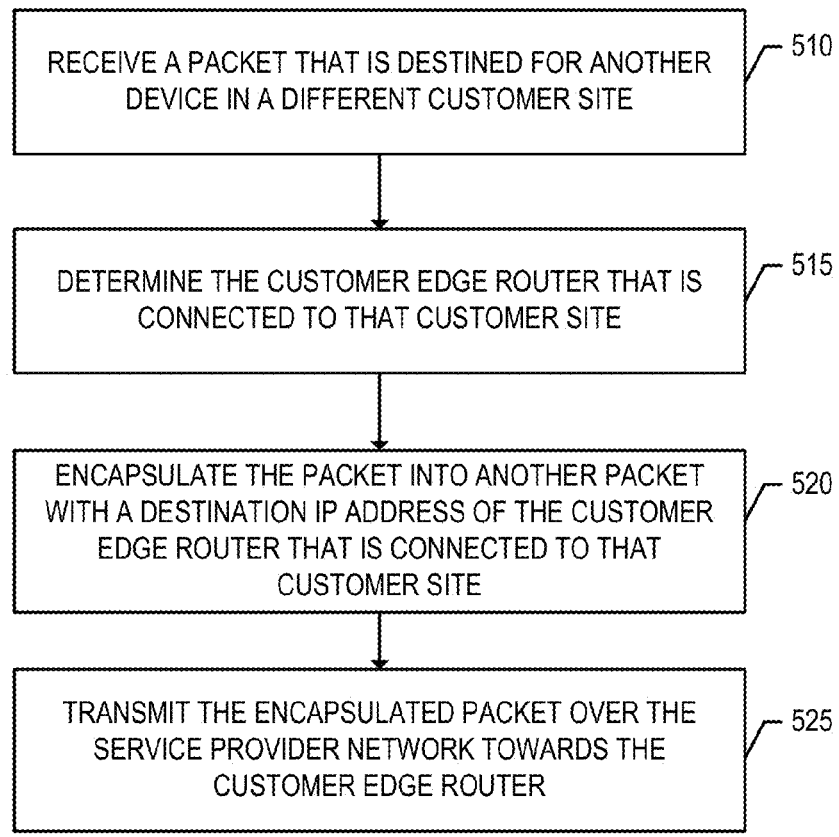
FIG. 5 is a flow diagram that illustrates exemplary operations performed by a customer edge router when receiving a data packet destined for another device in a different customer site according to one embodiment.

FIG. 5 is a flow diagram that illustrates exemplary operations performed by a customer edge router when receiving a data packet destined for another device in a different customer site according to one embodiment. At operation 510, the CE router receives a packet that is destined for another device in a different customer site. For example, with respect to FIG. 3, the CE router 202, of the site 244, may receive a packet from a device in the network 217 that is destined for the network 214 of the site 243. Flow then moves to operation 515 where the CE router determines the CE router that is connected to the destination customer site. The CE router accesses its forwarding/routing structure(s) using the destination IP address to determine which customer site the packet is destined for. For example, with respect to FIG. 3, the CE router 202 accesses its forwarding/routing structure(s) and determines that a packet destined for the network prefix 214 is to be transmitted to the CE router 201. Flow then moves to operation 520.

Figure 11:
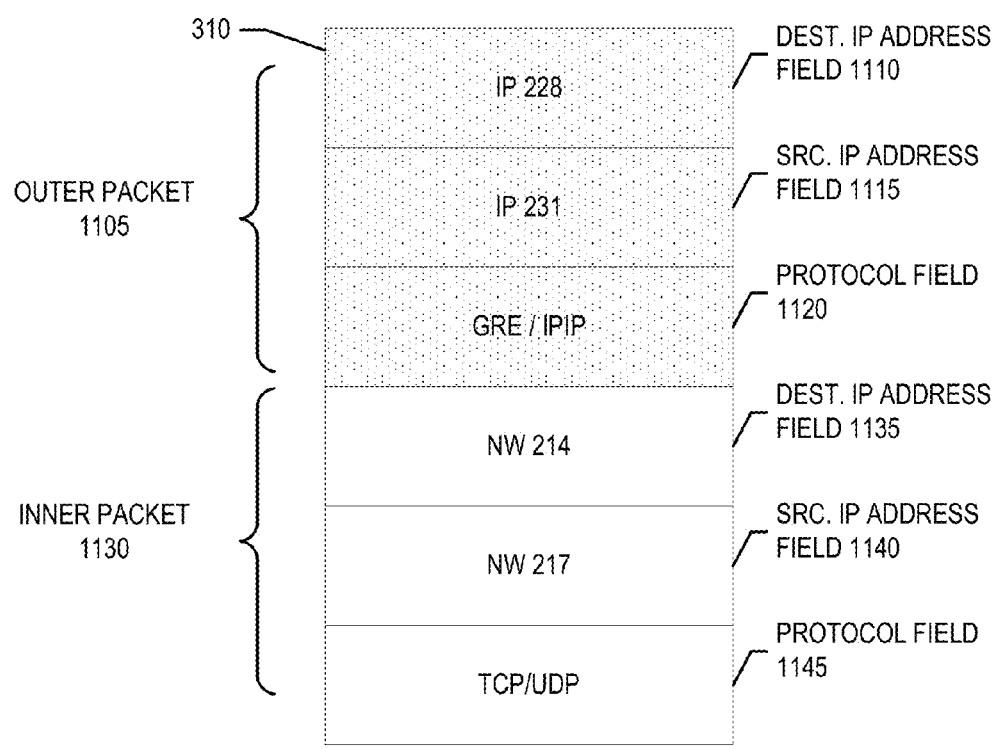
FIG. 11 illustrates an exemplary format of a data packet that has been encapsulated for the overlay network according to one embodiment.

At operation 520, the CE router encapsulates the packet into another packet to traverse the WAN of the service provider to reach the CE router of the other customer site. The destination IP address is a transport IP address of the CE router of the destination customer site. For example, the CE router 202 encapsulates the packet to generate the encapsulated packet 310 which includes an outer packet and an inner packet. FIG. 11 illustrates the packet 310 in more detail according to one embodiment. The packet 310 includes the outer packet 1105 and the inner packet 1130. The outer packet 1105 includes (among other fields), the destination IP address field 1110, the source IP address field 1115, and the protocol field 1120. The inner packet 1130 includes (among other fields) the destination IP address field 1135, the source IP address field 1140, and the protocol field 1145. Flow moves from operation 520 to operation 525.

At operation 525, the CE router transmits the encapsulated packet over the service provider network towards the destination CE router. For example, with reference to FIG. 3, the CE router 202 transmits the packet 310 over the service provider network 250 (which traverses the core 210) towards the CE router 201.

Figure 6:
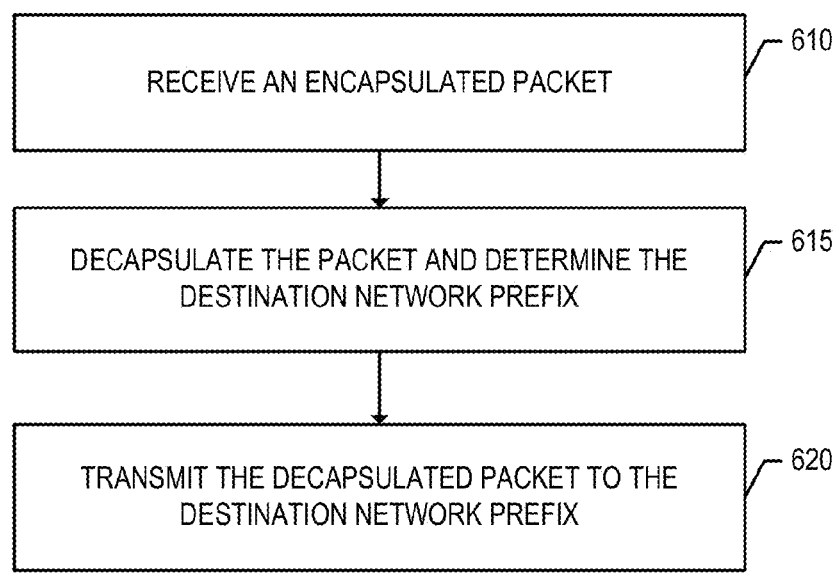
FIG. 6 is a flow diagram that illustrates exemplary operations performed by a customer edge router when receiving an encapsulated packet from another customer device that is destined for one of its private networks according to one embodiment.

FIG. 6 is a flow diagram that illustrates exemplary operations performed by a customer edge router when receiving an encapsulated packet from another customer device that is destined for one of its private networks according to one embodiment. At operation 610, the CE router receives an encapsulated packet. For example, with reference to FIG. 3, the CE router 201 receives the encapsulated packet 310. Flow then moves to operation 615 where the CE router decapsulates the packet and determines the destination network prefix. For example, the CE router 201 decapsulates the packet 310 (e.g., removes the outer packet 1105) and determines that the destination of the packet (the inner packet 1130) is the network 214. Flow then moves to operation 620 where the CE router transmits the decapsulated packet to the destination network prefix. For example, the CE router 201 transmits the packet to the destination network 214.

In some embodiments, the peering traffic between the CE/CPE and Route Reflector as well as the data-traffic between the CEs/CPEs can be secured using either SSL or IPSec.

The tunnel type (GRE, IP-in-IP, IPSec, SSL or L2TPv3) can also be available as a BGP attribute along with the tunnel Transport IP address. This would facilitate in automatically setting up the tunnels, instead of configuring the tunnel-type parameter at each CER.

Both approaches, IPSec and SSL, require a way to provide per-site authentication and session key generation capabilities. Since SSL handshakes are faster, and require lesser configuration, that may be a preferred choice.

In one embodiment, a configuration-free secure tunneling capability in the CE routers is created where the route reflector also acts a root certificate authority. In such an embodiment, the route reflector 211 is configured with a self-signed root CA certificate. The certificate's Distinguished Name or other fields can be encoded using the enterprise details, so as to differentiate from a different enterprise. The CE router 201 uses a 'random' number to seed and create a public/private key combination and uses this to send as a certificate sign request to the Route Reflector. The RR signs these using its root certificate. This ensures that the CE router 201 as well as the RR 211 has signed certificates which can be used for an SSL handshake or an IPSec tunnel.

In another embodiment, where the route reflector is not a root certificate authority, at least two of the CE routers 201-204 are configured to have a Virtual Machine (VM) application with a self-signed root CA certificate. This VM application, which holds the self-signed root CA certificate, would be independent from the routing application to interconnect the customer sites over the WAN using the overlay network. This Root-CA-VM would be contacted either by an SSL Client which is Local (on the same physical node as the Root-CA-VM) or SSL Clients from other external nodes. Thus even in this case, a certificate/private key does not need to be installed on each CE Router 201-204.

The secure transport for the route peering traffic, can be tunneled over an unsecured transport tunnel using IP-in-IP/GRE. These secure transport tunnels can be established when traffic is flowing between sites, and can be torn down when inter-site traffic is idle (based on a timeout).

If instead of a single routing table, a customer has multiple VPNs which span across various sites, then this mechanism can use the Multiprotocol BGP (MP-BGP) for propagating L3 VPN routes. In this case, each of the Customer Edge Routers (such as CER 201, CER 202, CER 203, CER 204) would host multiple VPNs and would function as a Layer3 VPN Provider Edge (L3PE) Router. Also, these routers (CER 201, CER 204) could interface with other edge-routers within the customer's network. By using route-reflector and tunneling techniques as described above, a customer may deploy L3VPN over a service provider's IP network. L3VPN over GRE may be used for carrying traffic with a Virtual Routing And Forwarding Label (VRF Label) from one CE to another CE.

Figure 7:
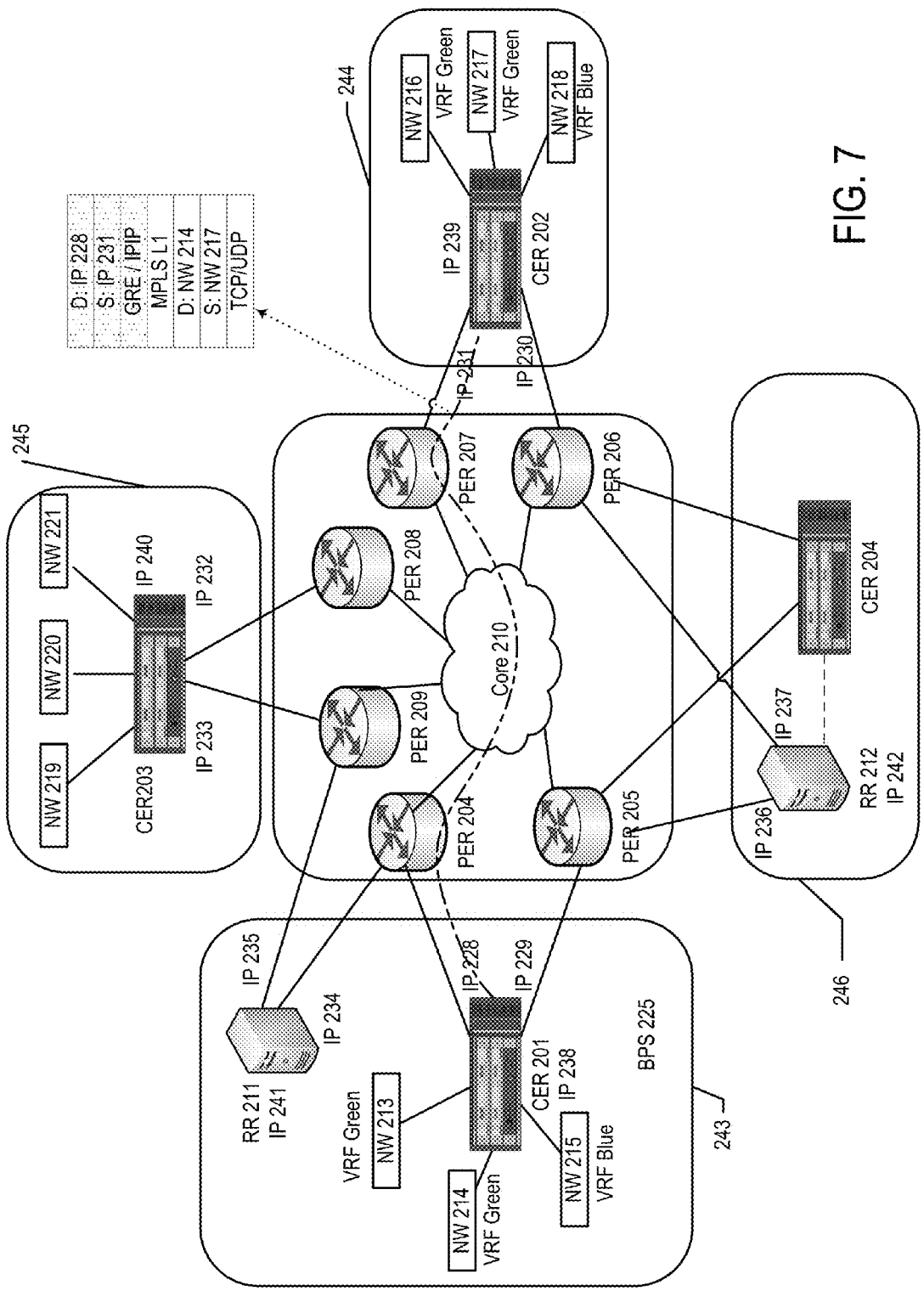
FIG. 7 illustrates the network of FIG. 2 with the addition that the networks of the customer sites belong to different VPNs according to one embodiment.

For example, FIG. 7 illustrates the network of FIG. 2 with the addition that networks 213 and 214 in site 243 belong to VRF Green in the customer's network. For example, when a station within site 244 residing in network 217 wants to communicate with another station residing in network 214 within site 243, the CE router 202 would encapsulate this packet with a VRF label (which indicates the VRF the packet belongs) and a transport/tunnel header. It would then send the traffic to the remote CER 201. The CER 201 would then decapsulate the packet by removing any transport/tunnel headers and the VRF label. The CER 201 then would route this packet towards the destination network NW 214.

Similar techniques of route reflector and tunneling will make L3VPN over this a reality. L3VPN over GRE could be used for CE to CE data path. It should also be noted that L3VPN could also be done with some other protocol such as IPSec and SSL as transport.

Failure Recovery

The networked described can experience failures similar to any other network. For example, there may be a failure of an access link that connects a CE router or route reflector and a PE router. As another example, there could be a loss of communication between a CE router and a PE router. This could happen if the local interface between the CE router and the PE router fails and goes down or if the PE router itself fails. As yet another example, there may be a loss of communication between a route reflector and a PE router. This could happen if the local interface between the route reflector and the PE router fails and goes down or if the route reflector and/or the PE router fails.

In some embodiments, one or more of the CE routers are connected to more than one PE routers for redundancy reasons (dual-homed). These PE routers could belong to different operators.

In the case of a failure of an access link connecting a CE Router or route reflector and a PE router, these types of failures can be detected by monitoring the local interface on the CE router or the route reflector. Additionally or alternatively, a keep-alive protocol may be used (ICMP Echo or Bidirectional Fault Detection (BFD)) between the CE router or route reflector and the PE router to detect the failure of an access link.

If a CER to Provider-Router interface fails (for example interface with IP Address IP address 228 for CER 201) and it goes down, then the non-reachability of this transport address will be sent to route reflector using either a BGP withdraw message (in case the information about the transport-address is communicated as a new NLRI) or a BGP update message (in case the information about the transport-address is communicated as an extended community or some other transitive attribute). The Route Reflector in turn would communicate this change in transport-addresses to reach a specific CER (e.g., CER 201) to other CERs (e.g., CER 202, CER 203 and CER 204). As a result, these CERs (e.g., CER 202, CER 203 and CER 204) would try to reach CER 201 using CER 201's alternate Transport IP address (IP address 229).

Figure 8:
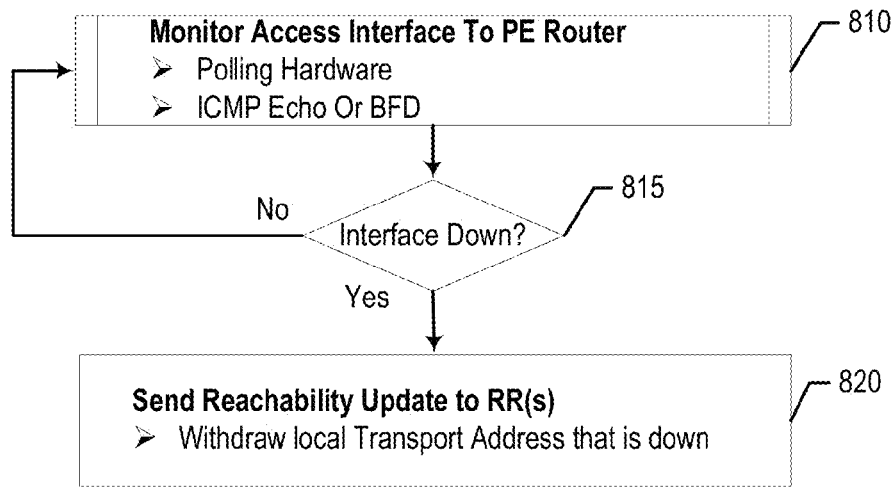
FIG. 8 is a flow diagram illustrating exemplary operations for handing a failure according to one embodiment.

FIG. 8 is a flow diagram illustrating exemplary operations for handing a failure according to one embodiment. The operations described with respect to FIG. 8 may be performed by a CE router and/or a route reflector. However, for the purposes of the below description, a CE router performing the operations will be described. At operation 810, a CE router monitors the access interface to a PE router. As described above, the PE router may monitor for failure trough the use of polling the hardware (the local interface) of the CE router and/or through use of a keep-alive protocol (e.g., ICMP Echo or BFD, etc.) between the CE router and the PE router. Flow then moves to operation 815. If the interface is detected as being down, then flow moves from operation 815 to operation 820; otherwise flow moves back to operation 810 where the monitoring continues. At operation 820, the CE router transmits a reachability update to the route reflector(s) that indicates to withdraw the local transport address that is down. The reachability update may be a BGP withdraw message (in which case the information about the transport-address is communicated as a new NLRI) or a BGP update message (in which case the information about the transport-address is communicated as an extended community or some other transitive attribute). The route reflector(s) then disseminate this information to the other CE routers in the network.

Figure 9:
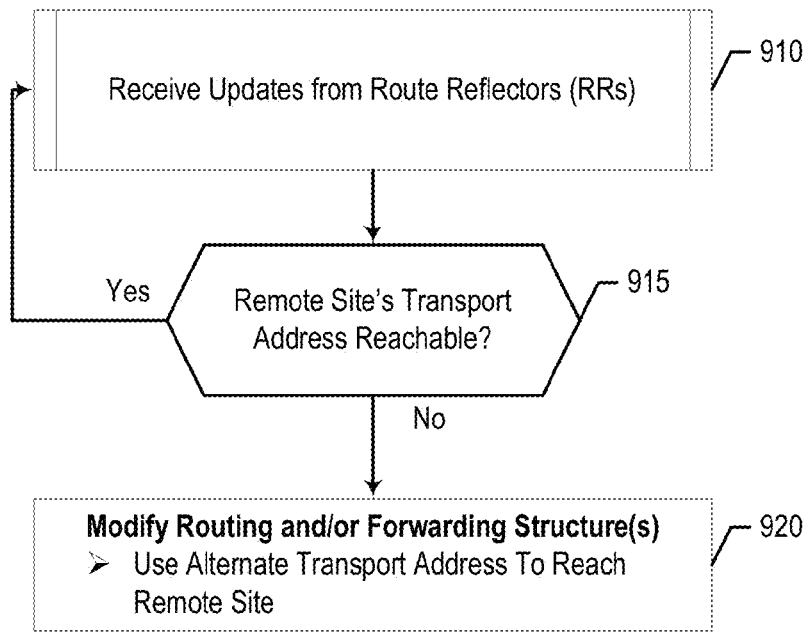
FIG. 9 is a flow diagram illustrating exemplary operations for a CE router updating its internal routing/forwarding structure(s) upon notification of a failure (or other communication change) affecting a remote site according to one embodiment.

FIG. 9 is a flow diagram illustrating exemplary operations for a CE router updating its internal routing/forwarding structure(s) upon notification of a failure (or other communication change) affecting a remote site according to one embodiment. At operation 910, the CE router receives an update from a route reflector that reflects a change affecting the reachability of a remote site. This message may be a BGP withdraw message or a BGP update message. Flow then moves to operation 915 where the CE router determines whether the remote site is reachable through its primary transport IP address. For example, the CE router transmits a hello message to that transport IP address and waits for a reply. If it does not receive a reply in a certain amount of time, the CE router may determine that the remote site is not reachable through its primary transport IP address. If it is reachable, then flow moves back to operation 910. If it is not reachable, then flow moves to operation 920 where the CE router updates its routing and/or forwarding structure(s) to use an alternative transport address to reach that remote site.

A failure of an intermediate link or an intermediate node in the Provider's Network may also occur, which may cause loss of routing control plane (BGP) connectivity between the CE router and the route reflector and/or cause loss of data-plane connectivity between two Customer Edge Routers.

In case IPSec is being used for tunneling, then IKE keep-alives could be used to detect a dead peer or link. If SSL is used for tunneling, then since SSL, runs over TCP, TCP keep alive are used to detect a reachability problem with the peer. Other protocols such as Bidirectional Fault Detection could also be used to monitor the health of an End to End tunnel between two peers. Similarly, if two CERs (say CER 201 and CER 202) discover through some mechanism (such as IKEv2 or BFD or TCP), that there is a loss of end to end connectivity between them, then they would both switch to an alternate tunnel.

Figure 10:
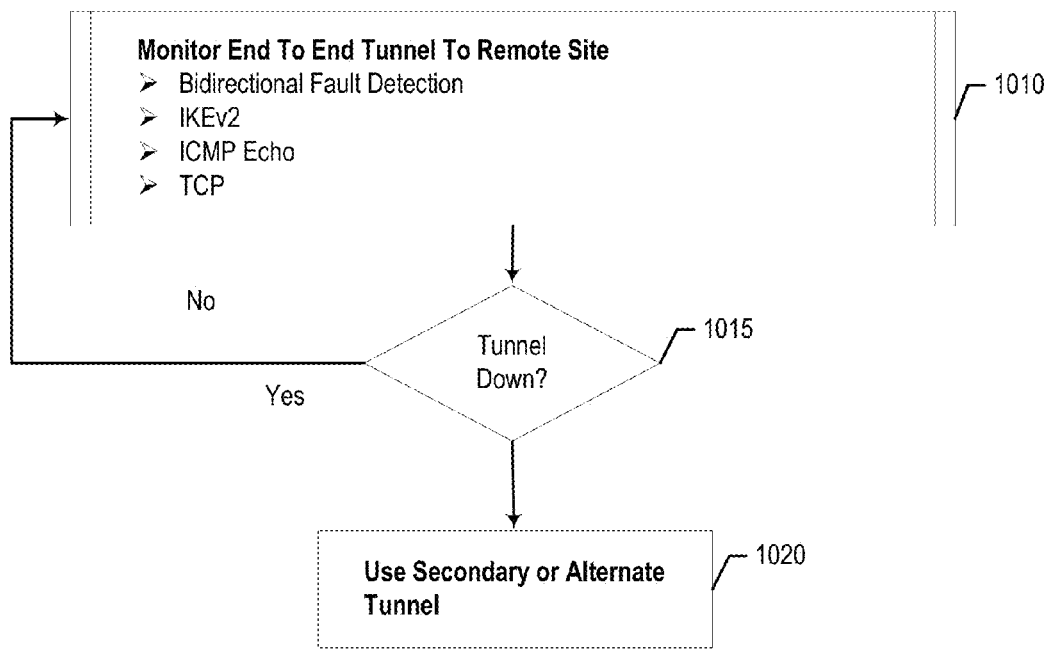
FIG. 10 is a flow diagram illustrating an end to end tunnel monitoring and failure recovery mechanism according to one embodiment.

FIG. 10 is a flow diagram illustrating an end to end tunnel monitoring and failure recovery mechanism according to one embodiment. At operation 1010, the CE router monitors the end-to-end tunnel to the remote site. For example, the monitoring may be performed through BFD, IKEv2, ICMP Echo, TCP, or other suitable mechanisms. Flow then moves to operation 1015. If the tunnel is detected as being down, then flow moves from operation 1015 to operation 1020; otherwise flow moves back to operation 1010 where the monitoring continues. At operation 1020 (the tunnel is down), the CE router sues a secondary or alternative tunnel.

As described herein, embodiments of the invention provide a mechanism where a CE router automatically discovers inter-site routes and control traffic paths as well to other VPN endpoints. In this case, the customers can buy Internet Protocol (IP) services as part of which they can get static IP addresses and can additionally use an overlay technology to achieve inter-site connectivity including Layer 3 (L3) VPNs. This solution may not be able to provide the same failover time as that provided by a mechanism using MPLS, but for several customers and applications, the failover times which would be provided by this mechanism may be sufficient and be at a reduced cost. Thus, with embodiments of the invention described herein, customers can achieve the inter-site layer 3 connectivity using their own customer edge (CE) routers and IP services from ISPs.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a CE router, a PE router, a route reflector, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for connecting a plurality of customer sites over a wide area network (WAN) of a service provider, wherein each of the plurality of customer sites includes a customer edge router, the method comprising:
    each of the customer edge routers establishing a Border Gateway Protocol (BGP) peer session with one or more route reflectors;
    each of the customer edge routers announcing the following to the one or more route reflectors:
        one or more local routes that are local to the customer site in which that customer edge router belongs;
        one or more tunnel IP addresses of one or more interfaces of that customer edge router, wherein the one or more interfaces of that customer edge router respectively connect that customer edge router to a set of one or more provider edge routers in the WAN; and
        a preferred tunnel type and tunnel specific information to reach that customer edge router, wherein the tunnel specific information includes one or more of an encryption key and a password, and wherein the preferred tunnel type and tunnel specific information facilitate automatically setting up secure communication between that customer edge router and other customer edge routers;
    the one or more route reflectors reflecting the one or more local routes, one or more tunnel IP addresses, and the preferred tunnel type and tunnel specific information received from each of the customer edge routers to the other ones of the customer edge routers;
    each of the customer edge routers installing the following that is received from the one or more route reflectors from a particular customer edge router: the one or more local routes, the corresponding one or more tunnel IP addresses of one or more interfaces of that particular customer edge router for which those one or more local routes belong, and the preferred tunnel type and tunnel specific information to reach that particular customer edge router;
    a first customer edge router performing the following in response to receiving a first packet from a first customer device that corresponds to a first local route in a first one of the plurality of customer sites, wherein the first packet is destined for a second customer device that corresponds to a second local route in a second one of the plurality of customer sites:
        determining that a second customer edge router provides reachability for the second local route,
        encapsulating the first packet within a second packet resulting in a first encapsulated packet for traversing the WAN of the service provider to reach the second customer edge router, wherein the second packet has a destination IP address that is one of the one or more tunnel IP addresses of one or more interfaces of the second customer edge router, and wherein the second packet has a source IP address that is one of the one or more tunnel IP addresses of one or more interfaces of the first customer edge router, and
        transmitting the first encapsulated packet over the WAN of the service provider towards the second customer edge router for decapsulation and delivery to the second customer device; and
    the second customer edge router performing the following in response to receiving the first encapsulated packet:
        decapsulating the first encapsulated packet to reveal the first packet,
        determining, from the first packet, that the second customer device is a destination of the first packet, and
        transmitting the first packet towards the second customer device.

2. The method of claim 1, wherein the one or more tunnel IP addresses of one or more interfaces of that customer edge router are announced as one of: a Network Layer Reachability Information (NLRI) utilizing a Sub Address Family Indicator (SAFI), an Extended Community, and a transitive BGP attribute.

3. The method of claim 1, wherein the one or more tunnel IP addresses announced by at least one of the customer edge routers includes a primary address and one or more secondary addresses.

4. The method of claim 3, wherein the at least one of the customer edge routers indicates a priority of the one or more tunnel IP addresses.

5. A method in a first customer edge router for connecting a first customer site with a set of one or more other customer sites over a wide area network (WAN) of a service provider, wherein the first customer edge router is connected to a set of one or more provider edge routers of the service provider, and wherein the first customer edge router is within the first customer site, the method comprising:
   transmitting reachability information to one or more route reflectors, wherein the transmitted reachability information includes the following:
      one or more tunnel IP addresses of one or more interfaces of the first customer edge router, wherein the one or more interfaces of the first customer edge router respectively connect the first customer edge router to the set of one or more provider edge routers of the service provider;
      one or more network prefixes that are reachable through the first customer edge router; and
      a preferred tunnel type and tunnel specific information to reach the first customer edge router, wherein the tunnel specific information includes one or more of an encryption key and a password, and wherein the preferred tunnel type and tunnel specific information facilitate automatically setting up secure communication between the first customer edge router with a set of one or more different customer edge routers in the set of one or more other customer sites over the WAN;
   receiving, from the one or more route reflectors, reachability information to reach one or more of the set of one or more other customer sites, wherein each of the set of one or more other customer sites includes the set of one or more different customer edge routers, wherein each of the received reachability information includes the following:
      one or more tunnel IP addresses of one or more interfaces of a different customer edge router, wherein the one or more interfaces of the different customer edge router respectively connect the different customer edge router to a set of one or more provider edge routers of the service provider;
      one or more network prefixes that are reachable through that different customer edge router; and
      the preferred tunnel type and tunnel specific information to reach that different customer edge router; and
   installing the reachability information received from the one or more route reflectors in one or more forwarding structures;
   receiving a first packet from a first customer device in the first customer site that is destined for a second customer device in one of the set of one or more other customer sites;
   determining, through accessing the one or more forwarding structures, which one of the set of one or more different customer edge routers provides reachability for the second customer device;
   encapsulating the first packet within a second packet resulting in a first encapsulated packet for traversing the WAN of the service provider to reach the customer edge router determined to provide reachability for the second customer device, wherein the second packet has a destination IP address that is one of the one or more tunnel IP addresses of one or more interfaces of the customer edge router determined to provide reachability for the second customer device that was received from the one or more route reflectors, and wherein the second packet has a source IP address that is one of the one or more tunnel IP addresses of one or more interfaces of the first customer edge router;
   transmitting the first encapsulated packet over the WAN of the service provider towards the customer edge router determined to provide reachability for the second customer device for decapsulation and delivery to the second customer device;
   receiving a second encapsulated packet, wherein the second encapsulation packet includes a third packet encapsulated within a fourth packet, wherein the fourth packet has a destination IP address that is one of the one or more tunnel IP addresses of one or more interfaces of the first customer edge router, and wherein the fourth packet has a source IP address that is one of the one or more tunnel IP addresses of one or more interfaces of the one of the set of one or more different customer edge routers;
   decapsulating the second encapsulated packet to reveal the third packet;
   determining a destination network prefix from the third packet, wherein the destination network prefix is one of the one or more network prefixes that are reachable through the first customer edge router; and
   transmitting the third packet towards the destination network prefix.

6. The method of claim 5, further comprising:
   establishing a Border Gateway Protocol (BGP) peer session with the one or more route reflectors prior to transmitting the reachability information to the one or more route reflectors.

7. The method of claim 5, wherein the one or more tunnel IP addresses of one or more interfaces of the first customer edge router included in the transmitted reachability information are announced as one of: a Network Layer Reachability Information (NLRI) utilizing a Sub Address Family Indicator (SAFI), an Extended Community, and a transitive BGP attribute.

8. The method of claim 5, further comprising:
   monitoring the one or more interfaces of the first customer edge router for failure;
   responsive to determining that one of the one or more interfaces of the first customer edge router is experiencing a failure, transmitting a reachability update to the one or more route reflectors that indicates that the tunnel IP address of that interface is experiencing a failure and should be withdrawn.

9. The method of claim 8, wherein the reachability update is one of a Border Gateway Protocol (BGP) withdraw message, and a BGP update message.

10. The method of claim 5, further comprising:
   wherein the received reachability information for at least one of the set of one or more different customer edge routers includes at least two tunnel IP addresses and specifies at least a primary tunnel IP address and a secondary tunnel IP address;

receiving, from one of the one or more route reflectors, an update that reflects a change affecting reachability to the at least one of the set of one or more different customer edge routers; and responsive to determining that the at least one of the set of one or more different customer edge routers is not reachable through its primary tunnel IP address, updating the one or more forwarding structures to use the secondary tunnel IP address to reach that customer edge router.

11. The method of claim 10, wherein the received update is one of a Border Gateway Protocol (BGP) withdraw message, and a BGP update message.

12. The method of claim 5, further comprising:

monitoring, with an end-to-end monitoring mechanism, a primary tunnel between a first one of the one or more interfaces of the first customer edge router and a first one of the one or more interfaces of one of the set of different customer edge routers; and responsive to determining that the tunnel is experiencing a failure, using a secondary tunnel between a second one of the one or more interfaces of the first customer edge router and a second one of the one or more interfaces of one of the set of different customer edge routers.

13. A customer edge router to connect a first customer site with a set of one or more other customer sites over a wide area network (WAN) of a service provider, wherein the customer edge router is to be connected to a set of one or more provider edge routers of the service provider, and wherein the customer edge router is to be within the first customer site, the customer edge router comprising:

a processor to execute instructions, and at least one non-transitory machine-readable storage medium coupled with the processor, the medium storing one or more instructions that, when executed, cause the processor to perform the following:

transmit reachability information to one or more route reflectors, wherein the reachability information includes the following:

one or more tunnel IP addresses of one or more interfaces of the customer edge router, wherein the one or more interfaces of the customer edge router respectively connect the customer edge router to the set of one or more provider edge routers of the service provider, one or more network prefixes that are reachable through the customer edge router, and a preferred tunnel type and tunnel specific information to reach the customer edge router, wherein the tunnel specific information includes one or more of an encryption key and a password, and wherein the preferred tunnel type and tunnel specific information facilitate automatically setting up secure communication between the customer edge router with a set of one or more different customer edge routers in the set of one or more other customer sites over the WAN;

receive, from the one or more route reflectors, reachability information to reach one or more of the set of one or more other customer sites, wherein each of the set of one or more other customer sites includes the set of one or more different customer edge routers, wherein each of the received reachability information includes the following:

one or more tunnel IP addresses of one or more interfaces of a different customer edge router, wherein the one or more interfaces of the different customer edge router respectively connect the different customer edge router to a set of one or more provider edge routers of the service provider;

one or more network prefixes that are reachable through that different customer edge router; and the preferred tunnel type and tunnel specific information to reach that different customer edge router; and install the reachability information to be received from the one or more route reflectors in one or more forwarding structures;

receive a first packet from a first customer device in the first customer site that is destined for a second customer device in one of the set of one or more other customer sites;

determine, through an access of the one or more forwarding structures, which one of the set of one or more different customer edge routers provides reachability for the second customer device;

encapsulate the first packet within a second packet resulting in a first encapsulated packet for traversing the WAN of the service provider to reach the customer edge router determined to provide reachability for the second customer device, wherein the second packet has a destination IP address that is one of the one or more tunnel IP addresses of one or more interfaces of the customer edge router determined to provide reachability for the second customer device that was received from the one or more route reflectors, and wherein the second packet has a source IP address that is one of the one or more tunnel IP addresses of one or more interfaces of the customer edge router;

transmit the first encapsulated packet over the WAN of the service provider towards the customer edge router determined to provide reachability for the second customer device for decapsulation and delivery to the second customer device;

receive a second encapsulated packet, wherein the second encapsulation packet includes a third packet encapsulated within a fourth packet, wherein the fourth packet has a destination IP address that is one of the one or more tunnel IP addresses of one or more interfaces of the customer edge router, and wherein the fourth packet has a source IP address that is one of the one or more tunnel IP addresses of one or more interfaces of the one of the set of one or more different customer edge routers;

decapsulate the second encapsulated packet to reveal the third packet;

determine a destination network prefix from the third packet, wherein the destination network prefix is one of the one or more network prefixes that are reachable through the customer edge router; and transmit the third packet towards the destination network prefix.

14. The customer edge router of claim 13, wherein the medium further stores one or more instructions that, when executed, cause the processor to perform the following:

establish a Border Gateway Protocol (BGP) peer session with the one or more route reflectors prior to transmission of the reachability information to the one or more route reflectors.

15. The customer edge router of claim 13, wherein the one or more tunnel IP addresses of one or more interfaces of the customer edge router included in the reachability information to be transmitted are announced as one of: a Network Layer Reachability Information (NLRI) utilizing a Sub Address Family Indicator (SAFI), an Extended Community, and a transitive BGP attribute.

* * * * *